United States Patent
Jones

(10) Patent No.: US 9,708,076 B2
(45) Date of Patent: Jul. 18, 2017

(54) LIGHTNING PROTECTION SYSTEM

(71) Applicant: BAE SYSTEMS PLC, London (GB)

(72) Inventor: Christopher Charles Rawlinson Jones, Preston (GB)

(73) Assignee: BAE Systems plc, London (GB)

( * ) Notice: Subject to any disclaimer, the term of this patent is extended or adjusted under 35 U.S.C. 154(b) by 77 days.

(21) Appl. No.: 14/775,277

(22) PCT Filed: Mar. 13, 2014

(86) PCT No.: PCT/GB2014/050754
§ 371 (c)(1),
(2) Date: Sep. 11, 2015

(87) PCT Pub. No.: WO2014/140583
PCT Pub. Date: Sep. 18, 2014

(65) Prior Publication Data
US 2016/0052643 A1  Feb. 25, 2016

(30) Foreign Application Priority Data

Mar. 14, 2013  (EP) .................................... 13275058
Mar. 14, 2013  (GB) .................................. 1304587.7

(51) Int. Cl.
*B64D 45/02* (2006.01)

(52) U.S. Cl.
CPC .................................. *B64D 45/02* (2013.01)

(58) Field of Classification Search
CPC .................................................... B64D 45/02
See application file for complete search history.

(56) References Cited

U.S. PATENT DOCUMENTS 3,416,027 A    12/1968  Amason et al.
3,906,308 A *   9/1975  Amason ................. B64D 45/02
                                                            244/1 A
(Continued)

FOREIGN PATENT DOCUMENTS

DE    102006046002 A1    4/2008
DE    102011112518 A1   11/2012
(Continued)

OTHER PUBLICATIONS

GB Search Report dated Aug. 14, 2013 of Patent Application No. GB1304587.7 filed Mar. 14, 2013.
(Continued)

*Primary Examiner* — Justin Benedik
(74) *Attorney, Agent, or Firm* — Maine Cernota & Rardin

(57) ABSTRACT

A system comprising a low observable aircraft (2) having its surfaces oriented at a limited number of directions, and a lightning diverter strip (4, 22, 30) comprising a plurality of electrically conductive elements (8, 24, 32) arranged in a spaced apart relation, each of the electrically conductive elements (8, 24, 32) comprising an elongate portion. The lightning diverter strip (4, 22, 30) is attached to the aircraft in such a way that the conductive elements (8, 24, 32) are located on an exposed outer surface of the lightning diverter strip (4, 22, 30) and exposed to atmospheric conditions. For each conductive element (8, 24, 32), a long axis of the elongate portion of that conductive element (8, 24, 32) is substantially parallel with a surface of the aircraft.

15 Claims, 3 Drawing Sheets

(56) References Cited

U.S. PATENT DOCUMENTS

| | | | | |
|---|---|---|---|---|
| 4,237,514 A | * | 12/1980 | Cline | B64D 45/02 361/117 |
| 4,329,731 A | | 5/1982 | Meulenberg, Jr. | |
| 4,506,311 A | * | 3/1985 | Cline | B64D 45/02 244/1 A |
| 4,796,153 A | | 1/1989 | Amason et al. | |
| 4,824,713 A | | 4/1989 | Brick | |
| 5,225,265 A | * | 7/1993 | Prandy | B29C 70/026 244/1 A |
| 7,247,368 B1 | | 7/2007 | Rogers | |
| 2005/0213278 A1 | * | 9/2005 | Hawley | B64D 45/02 361/212 |
| 2008/0137259 A1 | | 6/2008 | Heeter et al. | |
| 2009/0050735 A1 | * | 2/2009 | Sobol | B64D 45/02 244/1 A |
| 2009/0176112 A1 | * | 7/2009 | Kruckenberg | B82Y 30/00 428/457 |
| 2012/0152611 A1 | | 6/2012 | Fisher et al. | |

FOREIGN PATENT DOCUMENTS

| | | |
|---|---|---|
| EP | 0227122 A2 | 7/1987 |
| EP | 1944236 A2 | 7/2008 |
| EP | 2363429 A1 | 9/2011 |
| FR | 2720194 A1 | 11/1995 |
| FR | 2727784 A1 | 6/1996 |
| FR | 2924687 A1 | 6/2009 |
| GB | 1136895 A | 12/1968 |
| GB | 1580321 A | 12/1980 |
| GB | 2132027 A | 12/1984 |
| GB | 2295594 A | 5/1996 |
| WO | 2005071788 A2 | 8/2005 |
| WO | 2012116700 A1 | 9/2012 |

OTHER PUBLICATIONS

EP Search Report dated Jul. 18, 2013 of Patent Application No. EP13275058.9 filed Mar. 14, 2013.

PCT Search Report dated Sep. 22, 2014 of Patent Application No. PCT/GB2014/050754 filed Mar. 14, 2013.

EP Search Report dated Jul. 12, 2013 of Patent Application No. EP13275059 filed Mar. 14, 2013.

GB Search Report dated Aug. 15, 2013 of Patent Application No. GB1304586.9 filed Mar. 14, 2013.

PCT Search Report dated Sep. 25, 2014 of Patent Application No. PCT/GB2014/050755 filed Mar. 13, 2014.

* cited by examiner

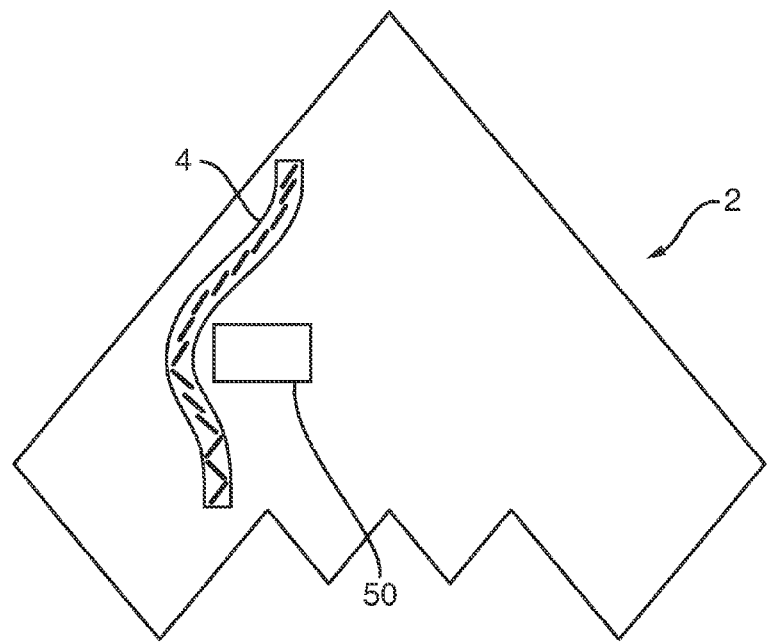
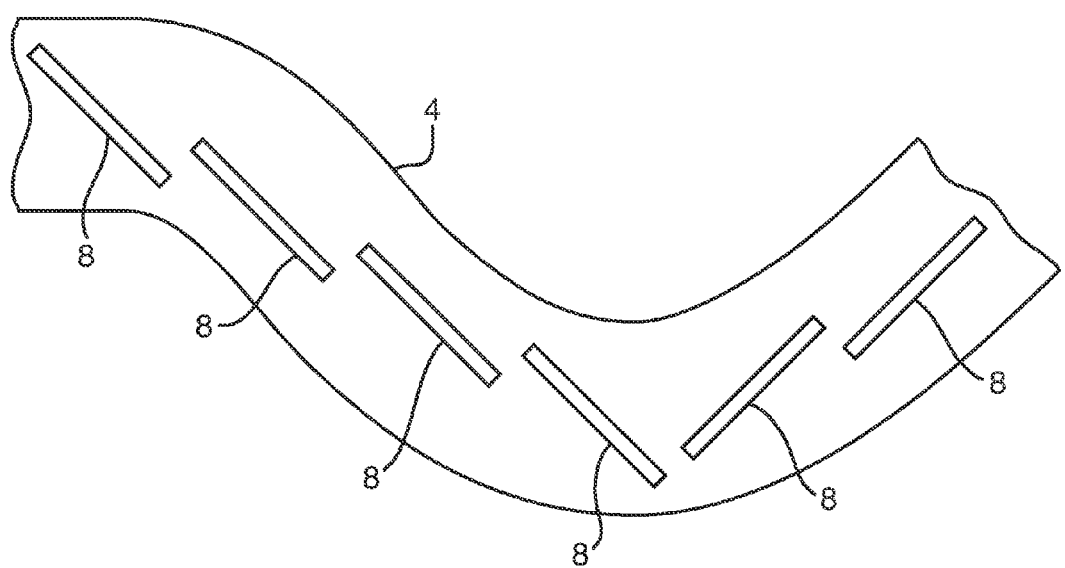

LIGHTNING PROTECTION SYSTEM

RELATED APPLICATIONS

This application is a national phase application filed under 35 USC §371 of PCT Application No. PCT/GB 2014/050754 with an International filing date of 13 Mar. 2014 which claims priority of GB Patent Application 1304587.7 filed 14 Mar. 2013 and EP Patent Application 13275058.9 filed 14 Mar. 2013. Each of these applications is herein incorporated by reference in their entirety for all purposes.

FIELD OF THE INVENTION

The present invention relates to lightning protection systems for vehicles.

BACKGROUND

Lightning diverter strips (such as those disclosed in U.S. Pat. No. 3,416,027 and U.S. Pat. No. 4,506,311) include a series of electrically conductive elements mounted along the length of a supporting fibre-glass strip.

Such devices are widely used, e.g. on aircraft radomes and the like, and divert electrical energy from lightning strikes, lightning attachments and the like, over an aircraft surface to a ground. This occurs due to the ionisation of air between the electrically conductive elements of the lightning diverter strip which creates a low impedance path along the length of the lightning diverter strip along which the electrical energy of the lightning strike travels.

In a separate field, planform alignment is used in the design of many stealth, or "Low Observable" (LO) (i.e. low detectability by radar systems), aircraft. Planform alignment involves using a small number of surface orientations in the shape of the structure of the aircraft. For example, leading and trailing edges of the aircraft wing, tail surfaces of the aircraft, and surface of other aircraft structures (such as intakes and apertures) may be set to be the same angle. This is done to so that the aircraft reflects radar signals that are detectable only in very specific directions relative to the aircraft, rather than returning a radar signal that may be detected at many different angles.

SUMMARY OF THE INVENTION

The present inventor has realised that conventional lightning diverter strips return or reflect radar signals that may be detected at many different angles.

In a first aspect, the present invention provides a system comprising a low observable aircraft having its surfaces oriented at a limited number of directions, and a lightning diverter strip comprising a plurality of electrically conductive elements arranged in a spaced apart relation, each of the electrically conductive elements comprising an elongate portion (e.g. the conductive elements may be elongate). The lightning diverter strip is attached to the aircraft in such a way that the conductive elements are located on an exposed outer surface of the lightning diverter strip and exposed to atmospheric conditions. For each conductive element, a long axis of the elongate portion of that conductive element is substantially parallel with a surface of the aircraft.

The lightning diverter strip may further comprise a substrate base strip, and the electrically conductive elements are resistively coupled on the base strip and arranged in a spaced apart relation thereon.

The conductive elements may be carbon nanotubes, the lengths of the carbon nanotubes being aligned with the length of the base strip.

The conductive elements may be configured such that: only for certain angles of incidence, a radar signal incident on the lightning diverter strip at one of those certain angles of incidence is reflected by the conductive elements back along the path along which the incident radar signal travelled; whereas for all other angles of incidence, a radar signal incident on the lightning diverter strip at one of those other angles of incidence is not reflected by the conductive elements back along the path along which the incident radar signal travelled.

The elongate portion of each conductive element may be substantially parallel to the elongate portion of every other conductive element.

Each conductive element may be an electrically conductive strip.

At least one end of each electrically conductive strip may be proximate to, and electrically separated from, an end of a different electrically conductive strip.

At least one end of each electrically conductive strip may be proximate to a side edge of the base strip.

Each conductive element may be an electrically conductive V-shaped element.

A vertex or an end of each V-shaped element may be proximate to, and electrically separated from, a vertex or an end of a different V-shaped element.

At least one end of each V-shaped element may be proximate to a side edge of the base strip.

In a further aspect, the present invention provides a method of protecting an aircraft against lightning strikes, the aircraft being a low observable aircraft having its surfaces oriented at a limited number of directions, the method comprising providing a lightning diverter strip comprising a plurality of electrically conductive elements arranged in a spaced apart relation, each of the electrically conductive elements comprising an elongate portion, and attaching the lightning diverter strip to the aircraft in such a way that (i) the conductive elements are located on an exposed outer surface of the lightning diverter strip and exposed to atmospheric conditions, and (ii) for each conductive element, a long axis of the elongate portion of that conductive element is substantially parallel with a surface of the aircraft.

The step of providing a lightning diverter strip may comprise providing a substrate base strip, and resistively coupling on to the base strip the plurality of electrically conductive elements such that the conductive elements are arranged in a spaced apart relation.

In a further aspect, the present invention provides a lightning diverter strip comprising a substrate base strip and a plurality of electrically conductive elements resistively coupled on the base strip and arranged in a spaced apart relation, wherein the conductive elements are configured to, for a plurality of angles of incidence, not reflect a radar signal that is incident on the lightning diverter strip at one of those angles of incidence back along the path along which the incident radar signal travelled. Thus, the conductive elements are configured to, for a plurality of angles of incidence, not reflect a radar signal that is incident on the lightning diverter strip at one of those angles of incidence back towards a source of that radar signal.

The conductive elements may be configured not to reflect radar signals incident on the lightning diverter strip.

The conductive elements may be carbon nanotubes. The lengths of the carbon nanotubes may be aligned with the length of the base strip.

The conductive elements may be configured such that, only for certain angles of incidence, a radar signal incident on the lightning diverter strip at one of those certain angles of incidence is reflected by the conductive elements back along the path along which the incident radar signal travelled, whereas for all other angles of incidence, a radar signal incident on the lightning diverter strip at one of those other angles of incidence is not reflected by the conductive elements back along the path along which the incident radar signal travelled.

Each conductive element may comprise an elongate portion. The elongate portion of each conductive element may be substantially parallel to the elongate portion of at least one other conductive element. The elongate portion of each conductive element may be substantially parallel to the elongate portion of every other conductive element.

Each conductive element may be an electrically conductive strip.

At least one end of each electrically conductive strip may be proximate to, and electrically separated from, an end of a different electrically conductive strip.

At least one end of each electrically conductive strip may be proximate to a side edge of the base strip.

Each conductive element may be an electrically conductive V-shaped element.

A vertex or an end of each V-shaped element may be proximate to, and electrically separated from, a vertex or an end of a different V-shaped element.

At least one end of each V-shaped element may be proximate to a side edge of the base strip.

In a further aspect, the present invention provides an aircraft comprising a lightning diverter strip in accordance with the first aspect.

The aircraft may be configured such that, only for certain angles of incidence, a radar signal incident on the aircraft at one of those certain angles of incidence is reflected by an aircraft surface back along the path along which the incident radar signal travelled, whereas, for all other angles of incidence, a radar signal incident on the aircraft at one of those other angles of incidence is not reflected by an aircraft surface back along the path along which the incident radar signal travelled. Also, the conductive elements of the lightning diverter strip may be configured such that, only for certain angles of incidence, a radar signal incident on the lightning diverter strip at one of those certain angles of incidence is reflected by the conductive elements back along the path along which the incident radar signal travelled, whereas, for all other angles of incidence, a radar signal incident on the lightning diverter strip at one of those other angles of incidence is not reflected by the conductive elements back along the path along which the incident radar signal travelled. The lightning diverter strip may be coupled to the aircraft such that the angles of incidence for which the conductive elements reflect a radar signal back along the path along which the incident radar signal travelled are substantially the same as the angles of incidence for which the aircraft surfaces reflect a radar signal back along the path along which the incident radar signal travelled.

In a further aspect, the present invention provides a method of protecting an aircraft against lightning strikes, the method comprising coupling, to an external surface of the aircraft, a lightning diverter strip, the lightning diverter strip being in accordance with any of the above aspects.

The aircraft may be configured such that, only for certain angles of incidence, a radar signal incident on the aircraft at one of those certain angles of incidence is reflected by an aircraft surface back along the path along which the incident radar signal travelled, whereas, for all other angles of incidence, a radar signal incident on the aircraft at one of those other angles of incidence is not reflected by an aircraft surface back along the path along which the incident radar signal travelled. The conductive elements of the lightning diverter strip may be configured such that, only for certain angles of incidence, a radar signal incident on the lightning diverter strip at one of those certain angles of incidence is reflected by the conductive elements back along the path along which the incident radar signal travelled, whereas, for all other angles of incidence, a radar signal incident on the lightning diverter strip at one of those other angles of incidence is not reflected by the conductive elements back along the path along which the incident radar signal travelled. The coupling of the lightning diverter strip to the aircraft may be such that the angles of incidence for which the conductive elements reflect a radar signal back along the path along which the incident radar signal travelled are substantially the same as the angles of incidence for which the aircraft surfaces reflect a radar signal back along the path along which the incident radar signal travelled.

In a further aspect, the present invention provides a method of producing a lightning diverter strip, the method comprising providing a substrate base strip and resistively coupling, on to the base strip, a plurality of electrically conductive elements such that the conductive elements are arranged in a spaced apart relation and, at least for some angles of incidence, a radar signal incident on the lightning diverter strip at one of those angles of incidence is not reflected by the conductive elements back along the path along which the incident radar signal travelled.

BRIEF DESCRIPTION OF THE DRAWINGS

FIG. 6 is a schematic illustration (not to scale) showing a top view of the aircraft; and FIG. 7 is a schematic illustration (not to scale) of a portion of the lightning diverter strip shown in FIG. 6.

DETAILED DESCRIPTION

Figure 1:
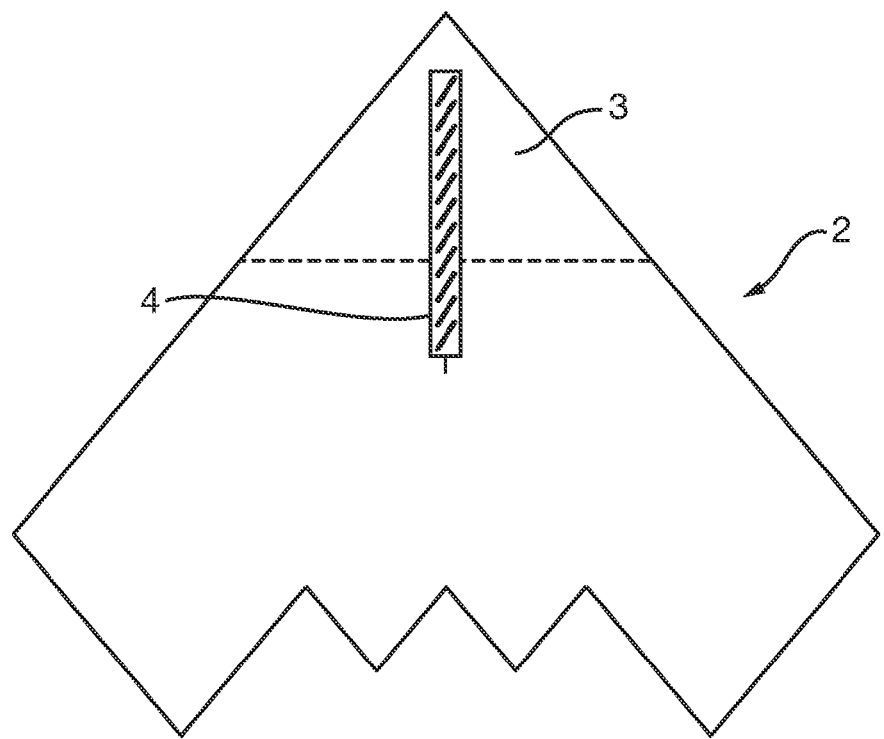
FIG. 1 is a schematic illustration (not to scale) of a top view of an example aircraft in which an embodiment of a lightning protection system is implemented.

FIG. 1 is a schematic illustration (not to scale) of a top view of an example aircraft 2 in which an embodiment of a lightning protection system is implemented.

In this embodiment, the aircraft 2 is a manned aircraft. However, in other embodiments, the aircraft 2 is an unmanned or autonomous aircraft. In other embodiments, the lightning protection.

In this is embodiment, the aircraft 2 is a "Low Observable" (LO) aircraft, i.e. an aircraft that is relatively difficult to detect using radar systems. In this embodiment, the principle of planform alignment has been used in the design of the shape of the aircraft 2, i.e. there are a relatively small number of different orientations of the surfaces of the aircraft structure compared to the number of different surface orientations in aircraft that are not Low Observable aircraft. In this embodiment, the leading edges of the aircraft wing are at the same angle as the edges of the trailing surfaces of the aircraft 2. Also, other structures, such as an air intake bypass doors and a re-fuelling aperture, also use the same angles as the aircraft wing/tail portions. The effect of planform alignment is that only radar radiation (emitted by a radar antenna) that is incident onto the aircraft 2 at a small number of specific angles (i.e. normal to the angles of orientation of the surfaces of the aircraft) is reflected back towards the radar antenna, whereas radar radiation that is incident onto the aircraft 2 at an angle other than one or those specific angles tends to be reflected away from the radar antenna. This is in contrast to aircraft that are not Low Observable aircraft. Such non-Low Observable aircraft would typically reflect incident radar radiation in many directions so that that aircraft is detectable at many angles. Thus, the aircraft 2 tends only to be "visible" to radar systems when it is at certain, very specific angles relative to the radar antenna of that system.

In this embodiment, the external surface of the aircraft 2 is made of or is coated in a radar-absorbent material (RAM) such as a foam absorber. The RAM that forms the external skin of the aircraft 2 tends to have relatively low electrical conductivity e.g. compared to the material that forms the aircraft frame.

In this embodiment, the aircraft 2 comprises a radome 3. The radome 3 is an enclosure that encases and protects (e.g. from the weather, debris etc.) a radar antenna (not shown). The radome 3 is constructed of material that minimally attenuates the electromagnetic signal transmitted or received by the radar antenna, i.e. the radome 3 is substantially transparent to radar or radio waves. In this embodiment, the surfaces of the radome 3 are orientated at the same angle as the other surfaces of the aircraft (e.g. the aircraft wing/tail portions) thereby preserving the aircraft's Low Observable properties. In this embodiment, the aircraft 2 further comprises a lightning diverter strip 4. The lightning diverter strip 4 is disposed, at least partially, on an outer surface of the radome 3. The lightning diverter strip 4 connects a point on the radome 3 to a different point on the structure of the aircraft, where a lightning strike can be safely grounded.

Typically, in practice a plurality of lightning diverter strips 4 will be arranged over the radome 3. However, for reasons of clarity and ease of understanding, only a single lightning diverter strip 4 is shown in FIG. 1.

Figure 2:
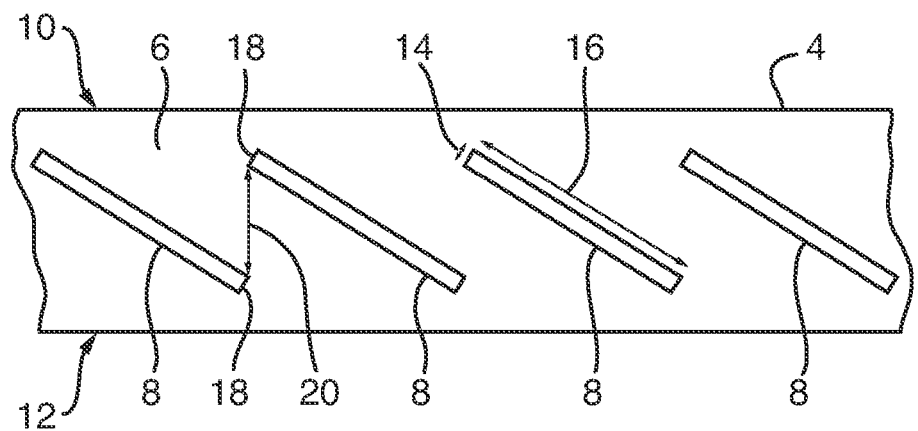
FIG. 2 is a schematic illustration (not to scale) showing a portion of a lightning diverter strip.

FIG. 2 is a schematic illustration (not to scale) showing a portion of the lightning diverter strip 4.

In this embodiment, the lightning diverter strip 4 includes a base or substrate strip 6 of relatively thin, flexible dielectric material. For example, the substrate strip 6 may be a strip of made of glass fibres held together by a suitable epoxy material.

The lightning diverter strip 4 further comprises a plurality of metal strips 8. In this embodiment, the metal strips 8 are straight metal strips.

Each of the metal strips 8, when viewed from above as in FIG. 2, has a rectangular shape having a small width 14 and longer length 16. The metal strips 8 may be any appropriate size. Relatively smaller metals strips 8 may be used to protect a radome 3 that houses very high frequency radar systems, as such strips 8 would tend to be less visible (i.e. more transparent) to such high frequencies than would a relatively larger strip. Relatively larger metal strips 8 may be used to protect a radome 3 that houses low frequency radar systems.

A metal strip 8 may, for example, have a length of between 1 mm and 5 mm. A metal strip 8 may, for example, have a width of less than 1 mm. A spacing between adjacent metal strips 8 may, for example, be between 0.1 mm and 1 mm.

In this embodiment, the metal strips 8 are disposed along the length of the substrate strip 6 such that they are not parallel with, or perpendicular to, the sides 10, 12 of the substrate strip 6.

Also, the metal strips 8 are disposed along the length of the substrate strip 6 such that they lie between the sides 10, 12 of the substrate strip 6, and such that an end 18 of a metal strip 8 is proximate to, but electrically and physically separated by a distance 20, from an end of a different metal strip 8. This separation (by distance 20) of the end points 18 of the metal strips 8 provides for ionisation of the space between adjacent metal strips 8.

When the lightning diverter strip 4 is attached to the aircraft 2 (as shown in FIG. 1 and described in more detail above), the metal strips 8 are located on the exposed outer surface of the lightning diverter strip 4, and are thus exposed to atmospheric conditions.

The lightning diverter strip 4 may further include any appropriate structures so as to provide a desired resistive coupling between the metal strips 8. For example, as described in more detail in U.S. Pat. No. 4,506,311 (the contents of with are included herein by reference), the lightning diverter strip 4 may further comprise a series of metal pads located on the back side of the substrate strip 6. Each metal pad may be located opposite to a respective metal strip 8. Also, each of the metal pads may be electrically connected to its respective metal strip 8. Alternatively, for example, the metal strips 8 may be rivets through the substrate strip 6 such as disclosed in an embodiment of U.S. Pat. No. 3,416,027 (the contents of with are included herein by reference).

The distance 20 between end points 18 of the metal strips 8 may be any appropriate distance. In some embodiments, the distances 20 between the ends 18 of the metal strips 8 are non-uniform along the length of the lightning diverter strip 4. In other words, the distances 20 may be varied (e.g. each distance 20 may be randomly selected from within a predetermined range of distances) along the length of the lightning diverter strip 4. This tends to advantageously provide a lower breakdown voltage across the length of the strip. However, in other embodiments, the distances 20 between the ends 18 of the metal strips 8 are non-uniform along the length of the lightning diverter strip 4.

In this embodiment, the ends 18 of the metal strips 8 are located proximate to the edges 10, 12 of the lightning diverter strip 4. The ends 18 tend to capture lightning strikes from the side of the lightning diverter strip 4 more readily than if round or circular buttons were used. This is due to the fact that the end 18 of the metal strips are relatively thin compared to a round or circular shape, and that gas at a relatively "sharp" point tends to break down at a lower voltage than that gas located at a round surface.

When struck by lightning, ionisation of gas between adjacent metal strips 8 (across the distance 20) occurs, thereby creating an ionised channel along which the lightning strike is directed to where it is safely grounded. Advantageously, due to the shape of the metal strips 8 (i.e. the relatively thin ends 18 of the strips), this ionisation between adjacent metal strips 8 tends to occur at lower voltages, compared to the voltages at which ionisation occurs when using diverter strips comprising circular metal buttons.

The shape of the metal strips 8 (i.e. the relatively long, relatively thin, straight strip shape) tends to provide only radar radiation that is incident onto the aircraft 2 at a small number of specific angles (e.g. normal to the long straight edges of the metal strip 8) is reflected back towards the emitting radar antenna, whereas radar radiation that is incident onto the metal strip at other angles (e.g. onto an end 18 of the metal strip 8) tends to be reflected away from the radar antenna.

In this embodiment, the lightning diverter strip 4 is attached to the outer surface of the aircraft 2 (i.e. to the outer surface of the radome 3 and other aircraft structures) such that metal strips 8 are aligned with the surfaces of the aircraft structure. In other words, the orientation of each of the metal strips is such that that metal strip is aligned, along its length, with (i.e. parallel to) a surface of the aircraft (e.g. a leading edge of the aircraft wing, an edge of the aircraft tail surface, etc.). In other words, the longitudinal axis of each metal strip 8 is substantially parallel with a surface of the aircraft 2.

Thus, the metallic strips 8 of the lightning diverter strip 4 tend to reflect, back towards an emitting radar antenna, only radar radiation that is incident onto the aircraft 2 at the same small number of specific angles at which the aircraft surfaces reflect radar radiation back towards an emitting radar antenna. Thus, the lightning diverter strip 4 onboard the aircraft 2 tends only to be "visible" to radar systems when it is at the same very specific angles relative to the radar antenna at which the aircraft 2 is visible.

In other words, the metallic strips 8 of the lightning diverter strip 4 tend to reflect, back towards an emitting radar antenna, only radar radiation that would be reflected back towards an emitting radar antenna by other aircraft structures.

Thus, the lightning diverter strip 4 advantageously tends not to be detrimental to the low-observability, or "stealthiness", of the aircraft 2. Thus, by arranging lightning diverter strip 4 such that the metal strips 8 are aligned with the aircraft surfaces, the aircraft's Low Observable properties are preserved.

Thus, a lightning diverter strip is provided.

The above described lightning diverter strip advantageously provides protection against lightning strikes to sensitive equipment housed in the aircraft radome.

The above described lightning diverter strip is advantageously aerodynamic, i.e. produces low drag.

The above described lightning diverter strip advantageously has insignificant effect on the radiation patterns of radar antenna housed within the aircraft radome.

The above described lightning diverter strip is advantageously as undetectable to radar systems as the aircraft upon which that lightning diverter strip is implemented, i.e. the lightning diverter strip may be used upon an aircraft while maintaining that aircraft's low-observable properties.

In the above embodiments, the conductive elements of the lightning diverter strip are metal strips. However, in other embodiments, a lightning diverter strip contains one or more differently shaped conductive elements instead of or in addition to one or more of the metal strips, the differently shaped conductive elements being arranged such that the above described Low Observable properties of the aircraft are maintained.

Figure 3:
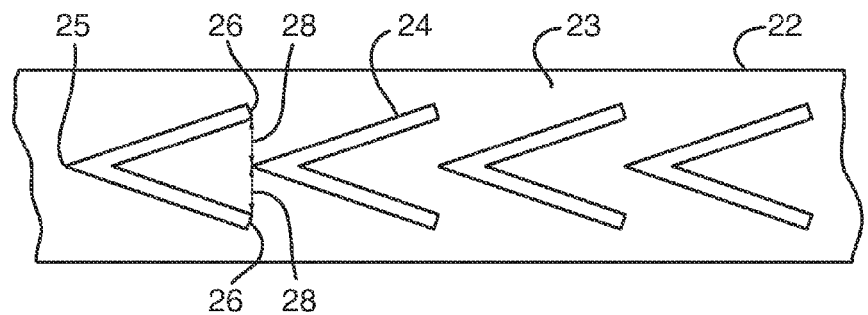
FIG. 3 is a schematic illustration (not to scale) showing a second embodiment of the lightning diverter strip.

FIG. 3 is a schematic illustration (not to scale) showing a second embodiment of the lightning diverter strip, hereinafter referred to as the "second diverter strip" and indicated in FIG. 3 by the reference numeral 22.

In this second embodiment, the second diverter strip 22 includes a base or substrate strip 23 made of relatively thin, flexible dielectric material.

The second diverter strip 22 further comprises a plurality of metal V-shaped, or chevron-shaped, conductive elements 24. The V-shaped elements 24 may be any appropriate size e.g. a size based upon the type of radar system housed within the radome 3 with which the second diverter strip 22 is to be implemented.

Each of the V-shaped elements 24 comprises a vertex 25 and two ends 26. In this embodiment, the V-shaped elements 24 are disposed along the length of the substrate strip 23 such that the vertices 25 of the V-shaped elements 24 lie longitudinally along the centre line of the substrate strip 23 between the sides of the substrate strip 23. Also, a of the V-shaped elements 24 "point" in the same direction along the length of the substrate strip 23 such that the vertex 25 of a V-shaped element 24 is proximate to the ends 26 of the adjacent V-shaped element 24. In particular, in this second embodiment, the V-shaped elements 24 are disposed on the substrate strip 23 such that the vertex 25 of a V-shaped element 24 is proximate to, but electrically and physically separated by a distance 28, the ends 26 of the adjacent V-shaped element 2. This separation (by distance 28) between adjacent V-shaped elements 24 along the second diverter strip 22 provides for ionisation of the space between adjacent V-shaped elements 24.

When the second diverter strip 22 is attached to the aircraft 2, the V-shaped elements 24 are located on the exposed outer surface of the second diverter strip 22, and are thus exposed to atmospheric conditions.

The second diverter strip 22 may further include any appropriate structures so as to provide a desired resistive coupling between the V-shaped elements 24.

The distance 28 between adjacent V-shaped elements 24 may be any appropriate distance. The distances 28 may be non-uniform, or uniform, along the length of the second diverter strip 22.

In this embodiment, the ends 26 of the V-shaped elements 24 are located proximate to the edges of the second diverter strip 22. The ends 26 tend to capture lightning strikes from the side of the second diverter strip 22 more readily than if round or circular buttons were used.

When struck by lightning, ionisation of gas between adjacent V-shaped elements 24 (across the distance 28) occurs, thereby creating an ionised channel along which the lightning strike is directed to where it is safely grounded. Advantageously, due to the shape of the V-shaped elements 24, this ionisation between adjacent V-shaped elements 24 tends to occur at lower voltages, compared to the voltages at which ionisation occurs when using diverter strips comprising circular metal buttons.

The shape of the V-shaped element 24 tends to provide only radar radiation that is incident onto the aircraft 2 at a small number of specific angles (e.g. normal to either of the straight portions/sides of the V-shaped element 24) is reflected back towards the emitting radar antenna, whereas radar radiation that is incident onto a V-shaped element 24 at other angles tends to be reflected away from the radar antenna.

In this second embodiment, the second diverter strip 22 is attached to the outer surface of the aircraft 2 (i.e. to the outer surface of the radome 3 and other aircraft structures) such that each of the two straight sides of each V-shaped element 24 is aligned with a surface of the aircraft structure. Thus, in this embodiment, the shape of the V-shaped element 24 mirrors that of the aircraft 2. The orientation of each of the V-shaped elements 24 is such that each side, or edge, of a V-shaped element 24 is aligned, along its length, with (i.e.

parallel to) a surface of the aircraft (e.g. a leading edge of the aircraft wing, an edge of the aircraft tail surface, etc.).

Thus, the V-shaped elements 24 of the second diverter strip 22 tend to reflect, back towards an emitting radar antenna, only radar radiation that is incident onto the aircraft 2 at the same small number of specific angles as which the aircraft surfaces reflect radar radiation back towards an emitting radar antenna. Thus, the second diverter strip 22 onboard the aircraft 2 tends only to be "visible" to radar systems when it is at the same very specific angles relative to the radar antenna at which the aircraft 2 is visible. Thus, the second diverter strip 22 advantageously tends not to be detrimental to the low-observability, or "stealthiness", of the aircraft 2.

Thus, a further embodiment of a lightning diverter strip is provided.

Figure 4:
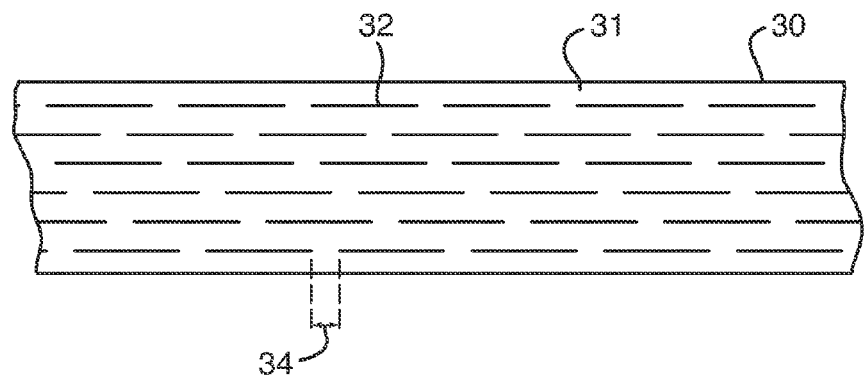
FIG. 4 is a schematic illustration (not to scale) showing a third embodiment of the lightning diverter strip.

FIG. 4 is a schematic illustration (not to scale) showing a third embodiment of the lightning diverter strip, hereinafter referred to as the "third diverter strip" and indicated in FIG. 4 by the reference numeral 30.

In this second embodiment, the third diverter strip 30 includes a base or substrate strip 31 made of relatively thin, flexible dielectric material.

The third diverter strip 30 further comprises a plurality of carbon nanotubes 32. Further information on carbon nanotubes may be found, for example, at American Physical Society, Phys. Rev. Lett. 87, 256805 (2001) "*Ambipolar Electrical Transport in Semiconducting Single-Wall Carbon Nanotubes*", which is incorporated herein by reference.

In this embodiment, the carbon nanotubes 32 are arranged such that the longitudinal axes of the carbon nanotubes 32 are substantially parallel to the longitudinal axis, i.e. centre line, of the substrate strip 31. In this way an end of a carbon nanotube 32 will tend to be located proximate to, but electrically and physically separated from, an end of a different, adjacent nanotube 32.

Each carbon nanotube 32 has relatively high electrical conductivity in the direction along the length of that carbon nanotube 32 (i.e. along the longitudinal axis of that carbon nanotube 32), and relatively very low electrical conductivity in other directions (e.g. perpendicular to the longitudinal axis of the carbon nanotubes 32).

When the third diverter strip 30 is attached to the aircraft 2, the carbon nanotubes 32 are located on the exposed outer surface of the third diverter strip 30, and are thus exposed to atmospheric conditions.

When struck by lightning, ionisation of gas between adjacent carbon nanotubes 32 occurs, thereby creating an ionised channel along which the lightning strike is directed to where it is safely grounded. Advantageously, due to the shape of the carbon nanotubes 32, this ionisation between carbon nanotubes 32 tends to occur at lower voltages, compared to the voltages at which ionisation occurs when using diverter strips comprising circular metal buttons.

The size and shape of the carbon nanotubes 32 advantageously means that they are substantially invisible, i.e. undetectable, by radar systems. In other words, advantageously, the carbon nanotubes 32 tend to have no measurable radar cross-section. In this embodiment, the carbon nanotubes 32 tend no to reflect incident radar radiation.

Thus, the third diverter strip 30 onboard the aircraft 2 tend to be "invisible" to radar systems, even if the axes of the carbon nanotubes 32 are not aligned with the aircraft surfaces. Thus, the third diverter strip 30 advantageously tends not to be detrimental to the low-observability, or "stealthiness", of the aircraft 2.

Thus, a further embodiment of a lightning diverter strip is provided.

In the lightning diverter strip shown in FIG. 1 and described in more detail earlier above, the metal strips are orientated in substantially the same direction. However, in other embodiments, one or more of the metal strips may be oriented in a different direction to the other metal strips. This may be such that, when the lightning diverter strip is coupled to the aircraft, metal strips align with different respective surfaces of the aircraft.

Figure 5:
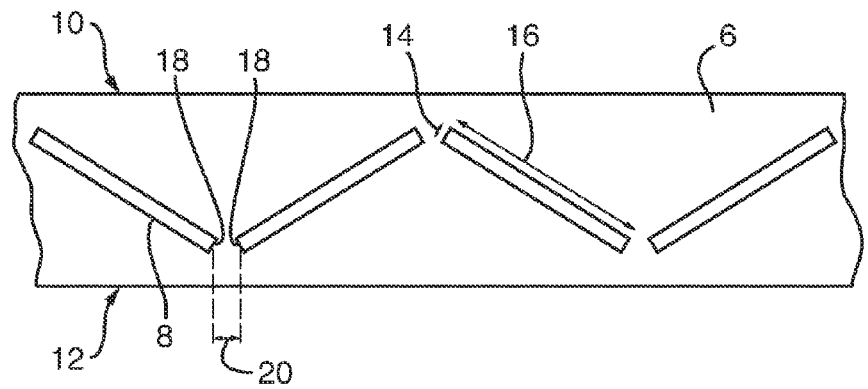
FIG. 5 is a schematic illustration (not to scale) showing a fourth embodiment of the lightning diverter strip.

FIG. 5 is a schematic illustration (not to scale) showing a fourth embodiment of the lightning diverter strip. The reference numerals used to describe FIG. 1 have been used in FIG. 4 to indicate like elements. In this fourth embodiment, some of the metal strips 8 have different orientations relative to other metal strips 8.

Having the capability of being able to orient metal strips in different directions, while maintaining the Low Observable properties of the aircraft, advantageously tends to lightning diverter strips of different shapes (e.g. curved diverter strips) to be produced and implemented, while maintaining the Low Observable properties of the aircraft. Such diverter strips may advantageously be used to direct lightning strikes away from, or around, systems located at or proximate to the aircraft's surface.

For example, FIG. 6 is a schematic illustration (not to scale) showing a top view of the aircraft 2. The aircraft 2 comprises a system 50 located on the surface of the 2. The lightning diverter strip 4 is arranged on the aircraft's surface such that lightning is directed, or diverted, away from and around the system 50. Thus, the system 50 is advantageously protected from a lightning strike by the lightning diverter strip 4, whilst the Low Observable properties of the aircraft 2 are maintained.

FIG. 7 is a schematic illustration (not to scale) of a portion of the lightning diverter strip 4 used in FIG. 6 to protect the aircraft system 50 from lightning strikes. In this embodiment, the metal strips 8 of the lightning converter strip 4 are oriented such that a curved lightning diverter strip 4 is provided. The curved lightning diverter strip 4 shown in FIGS. 6 and 7 advantageously directs lightning around the system 50, from its strike point to ground, thereby protecting the system from lightning.

In the above embodiments, the lightning protection system (provided by one or more of the above described lightning diverter strips) is implemented on an aircraft. However, in other embodiments, the lightning protection is implemented on a different type of system such as a different vehicle (e.g. a land-based, or sea-based vehicle), or a building.

In the above embodiments, the lightning protection system (provided by one or more of the above described lightning diverter strips) is used to protect systems and apparatus (e.g. a radar antenna) housed within a radome. However, in other embodiments, the lightning protection system is used to protect a different type of system.

In some of the above embodiments, some of the electrically conductive elements of the lightning diverter strips are made of metal. However, in other embodiments, one or more of the electrically conductive elements of a lightning diverter strip is made of a different type of material that is electrically conductive. Such different electrically conductive elements may have an above described shape so that the above described advantages are provided.

The invention claimed is:

1. A system comprising:
    a low observable aircraft (2) having its surfaces oriented at a limited number of directions according to a principle of planform alignment; and
    a lightning diverter strip (4, 22, 30) comprising a plurality of electrically conductive elements (8, 24, 32) arranged in a spaced apart relation, each of the electrically conductive elements (8, 24, 32) comprising an elongate portion; wherein
    the lightning diverter strip (4, 22, 30) is attached to the aircraft in such a way that the conductive elements (8, 24, 32) are located on an exposed outer surface of the lightning diverter strip (4, 22, 30) and exposed to atmospheric conditions; and
    for each conductive element (8, 24, 32), a long axis of the elongate portion of that conductive element (8, 24, 32) is substantially aligned with one of the directions.

2. The system according to claim 1, wherein the lightning diverter strip (4, 22, 30) further comprises a substrate base strip, and the electrically conductive elements (8, 24, 32) are resistively coupled on the base strip and arranged in a spaced apart relation thereon.

3. The system according to claim 2, wherein the conductive elements (8, 24, 32) are carbon nanotubes (32), the lengths of the carbon nanotubes (32) being aligned with the length of the base strip (31).

4. The system according to claim 1, wherein the conductive elements (8, 24, 32) are configured such that:
    only for certain angles of incidence, a radar signal incident on the lightning diverter strip (4, 22, 30) at one of those certain angles of incidence is reflected by the conductive elements (8, 24, 32) back along the path along which the incident radar signal travelled; whereas
    for all other angles of incidence, a radar signal incident on the lightning diverter strip (8, 24, 32) at one of those other angles of incidence is not reflected by the conductive elements (8, 24, 32) back along the path along which the incident radar signal travelled.

5. The system according to claim 1, wherein the elongate portion of each conductive element (8, 24, 32) is substantially parallel to the elongate portion of every other conductive element (8, 24, 32).

6. The system according to claim 1, wherein each conductive element (8, 24, 32) is an electrically conductive strip (8).

7. The system according to claim 6, wherein at least one end of each electrically conductive strip (8) is proximate to, and electrically separated from, an end of a different electrically conductive strip (8).

8. The system according to claim 2, wherein each conductive element (8, 24, 32) is an electrically conductive strip (8) and wherein at least one end of each electrically conductive strip (8) is proximate to a side edge of the base strip (6).

9. The system according to claim 1, wherein each conductive element (8, 24, 32) is an electrically conductive V-shaped element (24).

10. The system according to claim 9, wherein a vertex (25) or an end (26) of each V-shaped element (24) is proximate to, and electrically separated from, a vertex (25) or an end (26) of a different V-shaped element (24).

11. The system according to claim 2, wherein each conductive element (8, 24, 32) is an electrically conductive V-shaped element (24) and wherein at least one end (26) of each V-shaped element (24) is proximate to a side edge of the base strip (23).

12. A method of protecting an aircraft (2) against lightning strikes, the aircraft being a low observable aircraft (2) having its surfaces oriented at a limited number of directions according to a principle of planform alignment, the method comprising:
    providing a lightning diverter strip (4, 22, 30) comprising a plurality of electrically conductive elements (8, 24, 32) arranged in a spaced apart relation, each of the electrically conductive elements (8, 24, 32) comprising an elongate portion; and
    attaching the lightning diverter strip (4, 22, 30) to the aircraft in such a way that:
    the conductive elements (8, 24, 32) are located on an exposed outer surface of the lightning diverter strip (4, 22, 30) and exposed to atmospheric conditions; and
    for each conductive element (8, 24, 32), a long axis of the elongate portion of that conductive element (8, 24, 32) is substantially aligned with one of the directions.

13. The method according to claim 12 wherein the step of providing a lightning diverter strip (4, 22, 30) comprises:
    providing a substrate base strip (6, 23, 31); and
    resistively coupling on to the base strip (6, 23, 31) the plurality of electrically conductive elements (8, 24, 32) such that the conductive elements (8, 24, 32) are arranged in a spaced apart relation.

14. The method according to claim 13, wherein the conductive elements (8, 24, 32) are carbon nanotubes (32), the lengths of the carbon nanotubes (32) being aligned with the length of the base strip (31).

15. The method according to claim 12, wherein the elongate portion of each conductive element (8, 24, 32) is substantially parallel to the elongate portion of every other conductive element (8, 24, 32).

* * * * *